United States Patent [19]
Chou

[11] Patent Number: 5,753,821
[45] Date of Patent: May 19, 1998

[54] SINGLE DIAPHRAGM PRESSURE GAUGE WITH UNIFORM THICKNESS GAUGE FRAME

[75] Inventor: Chiu-Sung Chou, Chia-Yi, Taiwan

[73] Assignee: Chin Ray Industrial Co., Ltd., Chia-Yi Hsien, Taiwan

[21] Appl. No.: 778,429

[22] Filed: Jan. 2, 1997

[51] Int. Cl.⁶ .................................................. G01L 7/08
[52] U.S. Cl. ................................................................ 73/715
[58] Field of Search ................................ 73/706, 715, 716

[56] References Cited

U.S. PATENT DOCUMENTS

| | | | |
|---|---|---|---|
| 1,409,028 | 3/1922 | Richter | 73/715 |
| 4,040,298 | 8/1977 | Lee et al. | 73/715 |
| 4,685,336 | 8/1987 | Lee | 73/715 |

*Primary Examiner*—William L. Oen
*Attorney, Agent, or Firm*—Bacon & Thomas

[57] ABSTRACT

A pressure gauge structure that consists of a gauge frame with a graduated gauge face at the top of a lower base at the bottom. Protruding from the circumference of the lower base is an annular seat and a guide pipe that provides for gaseous flow. A diaphragm is positioned on the lower base and on the diaphragm is a coil spring topped by a shaft sleeve for a pivoting needle shaft in the tube mount protruding from the gauge face, with the needle shaft o the gauge meter positioned in a coil spring. A calibration rod extends laterally from the needle shaft, the upper end of which is secured in a pivotal state to the gauge face by a mounting base. Around the needle shaft is a spiral spring, one end mounted to the gauge frame and the other end attached to the needle shaft. Under the gauge frame is a hoop flange and the lower base has a guide pipe for gaseous flow. The diaphragm is constructed out of metal with corrugations formed on the surface. The annular seat, ring-shaped gasket and diaphragm are clamped together in the hoop flange, to form a sealed air chamber in between the diaphragm and the lower base that only allows for external access through the guide pipe.

1 Claim, 1 Drawing Sheet

SINGLE DIAPHRAGM PRESSURE GAUGE WITH UNIFORM THICKNESS GAUGE FRAME

BACKGROUND OF THE INVENTION

1. Field of the Invention

The invention herein relates to a kind of pressure gauge structure, specifically referring to a kind of pressure gauge that is effective for direct pressure sensing and features a simplified assembly structure.

2. Description of the Related Art

The early structure of pressure gauges consisted of Bourdon tube configurations, but today pressure gauges utilize diaphragms. The diaphragm-type pressure gauge, as indicated in FIG. 1, is mainly comprised of a primary diaphragm (13) ensconced in between the gauge frame (11) and the pivot mount (12) and the secondary diaphragm (14) positioned under the pivot mount (12). The lower base (16) is equipped with hoop flange (15) which enables clamping and insertion of the said gauge frame (11), the primary diaphragm (13), the pivot mount (12) and the secondary diaphragm (14) inside the hoop flange (15) of the lower base (16). Furthermore, there is a push rod (17) on the pivot base (12) such that respective upper and lower ends of the push rod (17) can be pushed down onto the primary diaphragm (13) and the secondary diaphragm (14). A coil spring (18) is positioned on the top of the said primary diaphragm (13) and, furthermore, protruding laterally from the pivot center of the shaft rod (20) is a calibration rod (19). The upper protruding aspect of the said shaft rod (20) is affixed to the gauge frame (11) and, furthermore, is positioned above the graduations of the gauge face (21) and is kept in position by a mounting base (22). The gauge needle (23) is positioned on the shaft rod (20) and rotates synchronously with the shaft rod (20). At the same time, a spiral spring (24) is installed onto the shaft rod (20); one end of the spiral spring (24) is secured to the gauge frame (11) and the other end is affixed onto the shaft rod (20). Therefore, the rotational movement of the shaft rod (20) causes tension in the spiral spring (24), which provides the countering force of rotational return.

In principle, these diaphragm-type pressure gauges utilize an air intake pipe (25) on a self-bottoming base (16) that inputs gaseous substances which push downward onto the secondary diaphragm (14), causing the secondary diaphragm to force the top end of the push rod (17) against the primary diaphragm (13) and thereby initiating the upward movement of the coil spring (18) on the primary diaphragm (13), which subjects the calibration rod (19) horizontally positioned on the pivotable shaft rod (20) to the transferred force and thereby produces the rotational movement that consequently rotates the gauge needle (23) on the gauge face (21) to indicate a pressure reading, with the spiral spring (24) then providing the return force for the shaft rod (20) to enable adjusting the gauge needle (23) to zero when no gaseous pressure is present.

However, these types of pressure gauges utilize the lower base (16) to clamp together the gauge frame (11), the primary diaphragm (13), the pivot mount (12) and the secondary diaphragm (14), which is a rather complex means of achieving optimal sealing effectiveness. Since the material thicknesses of the lower base (16) and the hoop flange (15) are not equal, unitary fabrication of the pressure gauge is mandatory so that the collective measurement variances in the thicknesses of the gauge frame (11), the primary diaphragm (11), the pivot mount (12) and the secondary diaphragm (14) do not preclude a sealed insertion due to imprecise shaping of the hoop flange (15), which would obviously result in well-known problems that would make expedient assembly impossible.

Furthermore, in conventional pressure gauges, the gaseous pressure sensing is dependent on the secondary diaphragm (14) and is indirectly relayed by the push rod (17) pushing downward onto the primary diaphragm (13). These kinds of pressure gauges convey erroneous physical readings and although extremely easily produced in terms of pressure gauge assembly completion, testing and adjustment prior to factory shipment is rather difficult. Furthermore, the common means of affixing the coil spring (18) to the primary diaphragm (13) with adhesives is a method that has a probability of mechanical seizure with long-term and repeated utilization.

SUMMARY OF THE INVENTION

The objective of the invention herein is to provide a kind of improved pressure gauge structure that includes a gauge frame with a graduated gauge face mounted on the top of the gauge frame and a lower base under the gauge frame, with an annular seat formed and protruding from the outer circumference of the said lower base and, furthermore, a guide pipe that provides for gaseous flow. Positioned on the lower base is a diaphragm and on the diaphragm is a coil spring and, furthermore, a tube mount having a shaft sleeve at top that provides for a pivotable needle shaft, which protrudes from the said gauge face and, furthermore, the needle shaft of the gauge needle is positioned inside the coil spring. The needle shaft also has a calibration rod extending laterally and the top end is secured in a pivotal state onto the gauge face with a mounting base. Around the needle shaft is a spiral spring, one end of which is mounted to the gauge frame and the other end to affixed to the needle shaft. There is hoop flange under the gauge frame and the lower base has guide pipe that provides for gaseous flow. After a ring-shaped gasket is installed onto the annular seat of the lower base, the diaphragm is positioned onto the said gasket and, furthermore, the said diaphragm is constructed out a metal material having a number of corrugations formed on the surface. The annular seat, ring-shaped gasket and the diaphragm are inserted into and clamped within the hoop flange of the gauge frame, thereby enabling the formation of a sealed air chamber in between the diaphragm and the lower base that only allows for external access through the guide pipe.

BRIEF DESCRIPTION OF THE DRAWINGS

Other features and advantages of the invention herein will become apparent in the following detailed description of the preferred embodiments, with reference to the accompanying drawings, of which.

DETAILED DESCRIPTION OF THE PREFERRED EMBODIMENT

In the detailed description of the preferred embodiment, similar elements are indicated by the same reference numbers throughout the disclosure.

Figure 1:
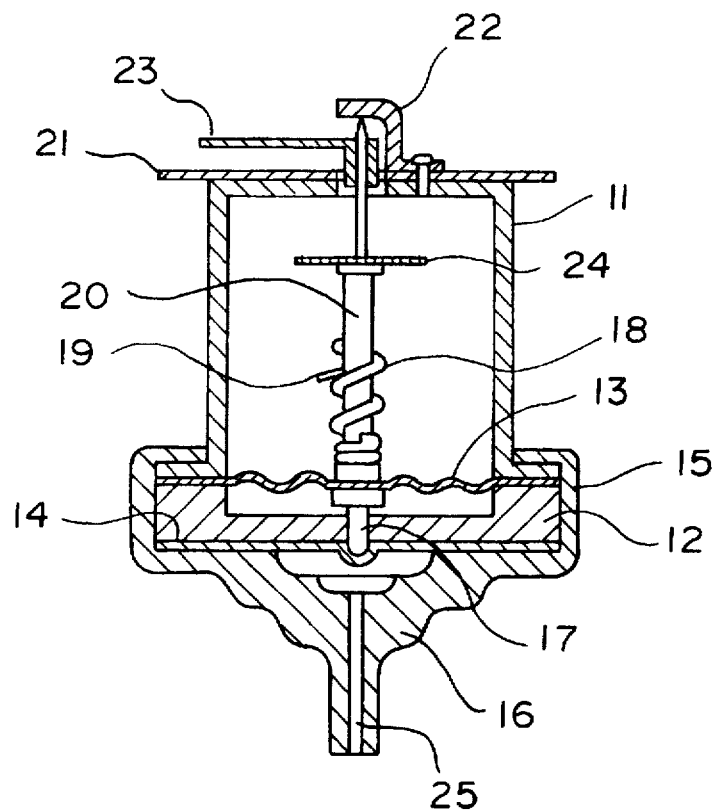
FIG. 1 is a cross-sectional drawing of a conventional pressure valve.
Figure 2:
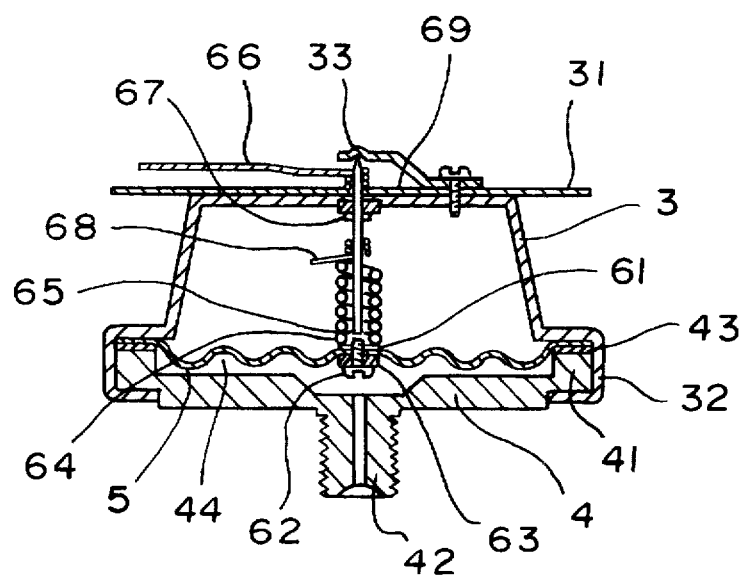
FIG. 2 is a cross-sectional drawing of the preferred embodiment of the invention herein.

Referring to FIG. 2, the preferred embodiment of the invention herein includes a gauge frame (3), a graduated gauge face (31) mounted to the top of the gauge frame (3)

and a hoop flange (32) affixed to the bottom. Additionally positioned at the bottom of the gauge frame (3) is a lower base (4) and protruding outward and formed from the said lower base (4) is an annular seat (41) and, furthermore, there is a guide pipe (42) to provide for gaseous flow. A ring-shaped gasket (43) is installed on the annular seat (41) of the lower base (4) and on the upper extent of the said gasket (43) is a metal diaphragm (5) having a number of formed corrugations and, furthermore, the annular seat (41), the gasket (43) and the diaphragm (5) are inserted into and clamped together by the hoop flange (32) of the said gauge frame (3), which enables the formation of sealed air chamber (44) in between the diaphragm (5) and the lower base (4) that only allows for external access through the guide pipe (42). Positioned on the diaphragm (5) is a tube mount (61) that is sealed thereon by means of a threaded fastener (62) against a washer (63), and the other end of the tube mount (61) is screwed through the air chamber (44) and the diaphragm (5), which thereby enables the tube mount (61) to be attached to the diaphragm (5). A coil spring (64) is overslung around the outer circumference of the tube mount (61) and in the center of the tube mount (61) is a shaft sleeve (65) that protrudes through the said gauge face (31) and, furthermore, the needle shaft (67) of the gauge needle (66) is pivotably positioned through the coil spring (64) into the shaft sleeve (65), and extending laterally from the needle shaft (67) is a calibration rod (68), and the top end of the needle shaft (67) secured in a pivotable state on the gauge face (31) by a mounting base (33).) Around the needle shaft (67) is a spiral spring (69), wherein one end is mounted to the gauge frame (3) and other end is fixed onto the needle shaft (67) and which thereby enables the calibration rod (68) to be lowered onto the spring line of the coil spring (64) as necessary to adjust the gauge needle (66) to zero.

During utilization, after a gaseous substance enters the air chamber (44) through the guide pipe (42), the resulting movement of the diaphragm (5) is directly transferred to tube mount (61) and the coil spring (64) mounted thereon, causing the calibration rod (68) on the needle shaft (67) to rotate downward to the spring line of the spiral spring (62) and thereby initiating the rotation of the gauge needle (66) to indicate pressure readings.

The preferred embodiment of the invention herein has the following advantages:

1. The gauge frame (3) is fabricated out of conventional sheet metal of equal thickness in all areas by equipment utilized to pressure form the hoop flange (32) of the gauge frame (3) such that the hoop flange (32) is sufficiently flexible to easily accommodate the tight clamping of the diaphragm (5), the annular seat (41) and the gasket (43) to achieve optimal sealing of the air chamber (44).

2. The tube mount (61) on the diaphragm (5) utilizes a threaded fastener (62) against a washer (63) to achieve sealing, with the other end of the tube mount (61) extending from the air chamber screw attached to the diaphragm (5), thereby enabling the tube mount (61) to be even more solidly and durably affixed onto the diaphragm (5).

3. After the ring-shaped gasket (43) is positioned on the annular seat (41) of the lower base (4), the metal diaphragm (5) having a number of formed corrugations is placed over the gasket (43), enabling the formation of a sealed air chamber (44) in between the diaphragm (5) and the lower base (4) such that the pressure of gaseous substances entering the guide pipe (2) creates a direct reaction in the metal diaphragm (5) that is converted into the movement of the gauge needle (66), which reduces the number of components that could possibly malfunction and, furthermore, enables rapid and accurate pressure measurements.

While the invention herein has been described in relation to what is considered the most practical and preferred embodiment, the disclosed embodiment shall not be construed as limitation of applicability, but shall additionally include the various configurations based on the principles and scope of the broadest interpretations and equivalent configurations of the invention herein.

What is claimed is:

1. A pressure gauge comprising:
   a) a lower base having an annular seat and a guide pipe configured to be attached to a pressure source;
   b) a gasket on the annular seat;
   c) a corrugated flexible metal diaphragm located on the gasket and covering the lower base so as to form a sealed air chamber between the diaphragm and the base, the sealed air chamber communicating with the pressure source through the guide pipe;
   d) a gauge frame having a hoop flange, the hoop flange having a substantially "U"-shaped cross-sectional configuration so as to attach the gauge frame, the diaphragm and the gasket to the lower base, the gauge frame and the hoop flange having a uniform thickness;
   e) a tube mount attached to one side of the diaphragm by a threaded fastener extending through the diaphragm;
   f) a coil spring located around the tube mount, the coil spring having a first end bearing against the diaphragm and a second end;
   g) a needle shaft having a first end extending through the gauge frame, the first end having an indicator needle attached thereto, and a second end extending into the coil spring, the needle shaft having a calibration rod extending laterally therefrom in contact with the coil spring;
   h) a gauge face attached to the gauge frame; and
   i) a spiral spring having a first end attached to the needle and a second end attached to the gauge frame.

* * * * *